United States Patent [19]

Casey

[11] Patent Number: 4,724,487
[45] Date of Patent: Feb. 9, 1988

[54] INTERLACE INVERSION DETECTOR FOR A PICTURE-IN-PICTURE VIDEO SIGNAL GENERATOR

[75] Inventor: Robert F. Casey, Plainsboro, N.J.

[73] Assignee: RCA Corporation, Princeton, N.J.

[21] Appl. No.: 15,407

[22] Filed: Feb. 17, 1987

[51] Int. Cl.[4] .................. H04N 5/272; H04N 5/262
[52] U.S. Cl. ..................................... 358/183; 358/22
[58] Field of Search .................. 358/183, 22, 182, 181

[56] References Cited

U.S. PATENT DOCUMENTS

| | | | |
|---|---|---|---|
| 4,249,213 | 2/1981 | Imaide et al. | 358/183 |
| 4,267,560 | 5/1981 | Ishikawa et al. | 358/22 |
| 4,347,532 | 8/1982 | Korver | 358/183 |
| 4,623,915 | 11/1986 | Bolger | 358/183 X |
| 4,656,515 | 4/1987 | Christopher | 358/183 |
| 4,656,516 | 4/1987 | Fling et al. | 358/183 |
| 4,665,438 | 5/1987 | Miron et al. | 358/183 |
| 4,682,234 | 7/1987 | Naimpally | 358/183 |

FOREIGN PATENT DOCUMENTS 54-156420 12/1979 Japan .................................. 358/183

OTHER PUBLICATIONS

"LM1881 Video Sync Separator"; National Semiconductor, Preliminary, Apr. 1986.

Primary Examiner—James J. Groody
Assistant Examiner—E. Anne Faris
Attorney, Agent, or Firm—E. M. Whitacre; P. J. Rasmussen; E. P. Herrmann

[57] ABSTRACT

A picture-in-picture image signal generator includes a source of an auxiliary video signal and an auxiliary synchronization component separator which produces an auxiliary odd/even field signal. Auxiliary image data is stored in a memory for subsequent retrieval. A source of a main video signal and associated synchronization component separator, which produces a main odd/even field signal, is also provided. A signal combiner combines a portion of the main video signal with data retrieved from the memory to form a picture-in-picture video signal. An interlace inversion detector generates a signal indicating an interlace inversion condition in response to the main and auxiliary odd/even field signals. A correction to the interlacing is made in response to the interlace inversion signal.

4 Claims, 3 Drawing Figures

INTERLACE INVERSION DETECTOR FOR A PICTURE-IN-PICTURE VIDEO SIGNAL GENERATOR

The present invention relates to a video sigjnal generator for generating a signal representing both a main picture and an auxiliary picture simultaneously and to apparatus for detecting improper interlacing of the main and auxiliary pictures.

Known picture-in-picture television receivers include two video signal channels, a main and an auxiliary channel, each including a tuner; and IF chain; and a video detector. The information from the auxiliary channel is compressed and stored in a memory in synchronism with the auxiliary video signal. This stored information is retrieved in synchronism with the main video signal and replaces a portion of the main video signal at a predetermined image location. In this way, a picture-in-picture video signal is formed representing an image having a first region which displays the main video image, as represented by the main video signal and a second, usually smaller, region which displays the auxiliary video image, as represented by the auxiliary video signal.

An NTSC standard video signal consists of successive frames of 525 lines made up of two interlaced fields of 262½ lines each. Odd fields, which contain lines 1, 3, 5, ... etc., alternate with even fields, which contain lines 2, 4, 6, ... etc. of the 525 line image. A sampled-data process NTSC signal sampled at a rate of, for example, four times the color subcarrier frequency contains 910 samples in each line.

The auxiliary video signal is compressed by storing in the memory only every third sample of every third line. Each field of compressed auxiliary image information, thus, comprises 87 lines of 303 samples each. Odd compressed fields may contain information from every third odd line, i.e. lines 1, 7, 13, ... etc., and even compressed fields may contain information from every third even line i.e. lines 4, 10, 16, ... etc., of the 525 line image.

In each field of the main video signal, a portion, consisting of 303 adjoining samples of 87 adjoining lines, is replaced by the previously stored field of compressed auxiliary samples. If this portion is located in the lower right hand corner, for example, samples 607 through 909 (totaling 303 samples) of lines 175 through 261 (totaling 87 lines) of the main video signal are replaced with the previously stored compressed auxiliary video samples to form the picture-in-picture video signal. In an odd field of the main video signal, the affected lines are lines 349, 351, 353, ... 519 & 521 (totaling 87 lines) of the 525 line picture-in-picture video signal image. In an even field, the affected lines lines are lines 350, 352, 354, ... 520 & 522 (totaling 87 lines) of the 525 line picture-in-picture video signal image.

If the previously stored field of the auxiliary video signal was from an odd field, and it is inserted into an odd field of the main video signal, and an even field of the auxiliary video signal is inserted into an even field of the main video signal, then lines 349, 350, 351, etc. of the 525 line picture-in-picture video signal contains lines 1, 4, 7, etc. of the 525 line auxiliary video signal signal respectively. If, however, the previously stored field of the auxiliary video signal was from an even field and it is inserted into an odd field of the main video signal, and an odd field of the auxiliary video signal is inserted into an even field of the main video signal, then lines 349, 350, 351, 352, etc. of the 525 line picture-in-picture video signal contains lines 4, 1, 10, 7, etc. of the 525 line auxiliary video signal, respectively. The interlace of the auxiliary video image in the picture-in-picture video image is, thus, inverted, and the display scrambled. This situation must be detected so that a correction to the interlacing may be made.

In accordance with principles of the present invention, a main synchronization component separator produces a main odd/even signal having a first state during even fields of the main video signal and a second state otherwise. An auxiliary synchronization component separator produces an auxiliary odd/even signal having a first state during even fields of the auxiliary video signal and a second state otherwise. An interlace inversion detector is also included and produces a signal having a first state when the main and auxiliary even-/odd signals indicate that an interlace inversion condition exists, and a second state otherwise.

The preferred embodiment discussed below, operates on a black and white video signal. Three such systems may be combined to operate on components of a color composite video signal: either luminance and two color difference signals, or red, green and blue signals.

Figure 1:
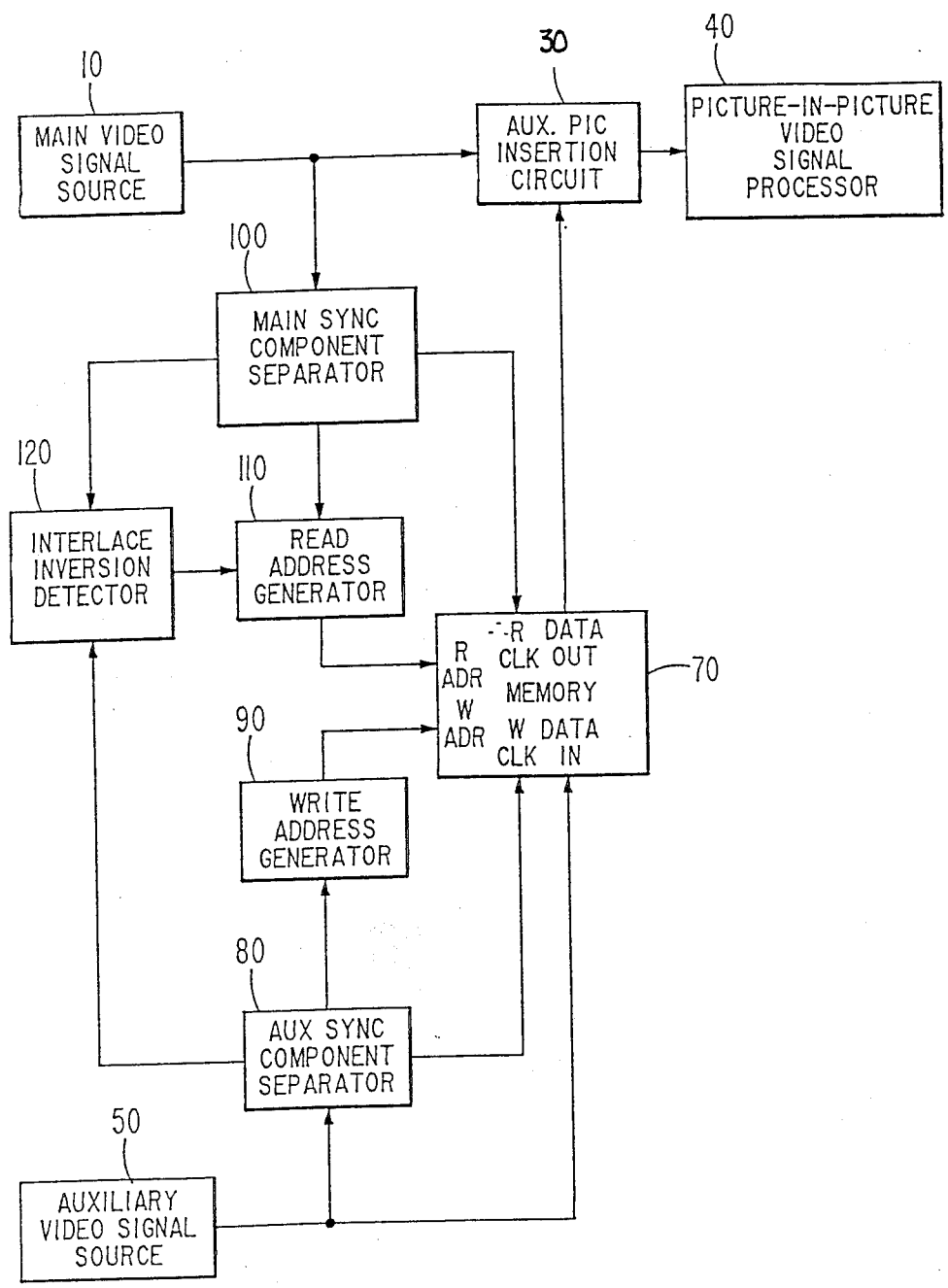
FIG. 1 is a block diagram of an exemplary embodiment of a picture-in-picture image signal generator employing an interlace inversion detector according to the present invention.

In FIG. 1, a source 10 of a main video signal produces a video signal. This source may, for example, include an antenna, tuner, IF chain, video detector and luminance/chrominance separator as found in a standard color television receiver. An output terminal of the main video signal source 10 is coupled to an input terminal of an auxiliary picture insertion circuit 30. An output terminal of auxiliary picture insertion circuit 30 is coupled to a picture-in-picture video signal processor 40. Video signal processor 40 may include video amplifiers, a picture tube, and deflection circuitry as found in a standard color television receiver.

An auxiliary video signal source 50 also supplies a video signal. The auxiliary video signal source 50 may comprise, for example, a second tuner, IF chain, video detector, and luminance/chrominance separator similar to those which may be found in the main video signal source 10. An output terminal of the auxiliary video signal source 50 is coupled to a data input terminal of a memory 70. A data output terminal of memory 70 is coupled to a second input terminal of the auxiliary picture insertion circuit 30. Memory 70, for example, may have the capacity to hold three fields of compressed auxiliary video signal information.

The output terminal of the auxiliary video signal source 50 is also coupled to an input terminal of an auxiliary synchronization component separator 80. A first output terminal of auxiliary synchronization separator 80 is coupled to a write clock W CLK input terminal of memory 70. A second output terminal of the auxiliary synchronization component separator 80 is coupled to an input terminal of a write address generator 90. A third output terminal of auxiliary synchronization component separator 80 is coupled to an input terminal of an interlace inversion detector 120. An output terminal of the write address generator 90 is coupled to a write address W ADR input terminal of memory 70.

The output terminal of main video signal source 10 is also coupled to an input terminal of a main synchronization component separator 100. A first output terminal of main synchronization component separator 100 is coupled to a read clock R CLK input terminal of memory 70. A second output terminal of main synchronization component separtor 100 is coupled to an input terminal of a read address generator 110 and a third output terminal of main synchronization component separator 100 is coupled to a second input terminal of interlace inversion detector 120. An output terminal of interlace inversion detector 120 is coupled to a second input terminal of read address generator 110.

In operation, auxiliary video signal source 50 produces, for example, a sequence of samples representing an auxiliary image, organized as successive frames of alternating odd and even fields. Samples from the auxiliary video signal source 50 are stored in predetermined locations in memory 70 in synchronism with the auxiliary video signal. This synchronism is maintained by the clock signal supplied from first output terminal of the auxiliary synchronization component separator 80 to the write clock W CLK input terminal of memory 70. Write address generator 90 produces a sequence of addresses corresponding to the predetermined locations in the memory 70 in which samples of the current auxiliary video signal field are stored.

Samples, from memory 70, representing the auxiliary video signal image are substituted for appropriate main video signal samples in the auxiliary picture insertion circuitry 30. The reading of these previously stored samples from memory 70 is in synchronism with the main video signal source. This synchronism is maintained by the clock signal supplied from the first output terminal of the main synchronization component separator 100 to the read clock R CLK input terminal of memory 70. Read address generator 110 produces a sequence of addresses corresponding to the predetermined locations in the memory 20 in which samples of the previously stored auxiliary video signal field are stored.

There are four combinations of even and odd fields of the main and auxiliary video signal sources. First, an even field of the main video signal may have even-field auxiliary video signal information inserted into it in auxiliary picture insertion circuit 30. Second, an odd field of the main video signal may have odd-field auxiliary video signal information inserted into it. Third, an even field of the main video signal may have odd-field auxiliary video signal information inserted into it. Fourth, an odd field of the main video signal source may have even-field auxiliary video signal information inserted into it. In the first and second cases, the interlace inversion problem will not occur.

In the third and fourth cases, however, the interlace inversion problem will occur. In order to detect (and correct) this problem, interlace inversion detector 120 receives signals from the third output terminals of the auxiliary 80 and main 100 synchronization component separators, respectively. These signals indicate whether the current field of the corresponding video signal is an odd field or an even field. The interlace inversion detector 120 supplies a signal to the read address generator 110 which indicates that the third or fourth case described above has been detected.

In response to this signal, the read address generator 110 generates a sequence of addresses, which is modified with respect to the normal sequence, to correct the interlace inversion. For example, in the system described above, lines 349, 350, 351, 352, etc. of the unmodified 525 line picture-in-picture video signal include lines 4, 1, 10, 7 etc. of the auxiliary video signal, respectively. If the lines inserted into the odd field of the main video signal remained unchanged, but those inserted into the even field were to begin with the second line previously stored, i.e. line 7, instead of the first (line 1), the lines 349, 350, 351, 352, etc. of the modified 525 line picture-in-picture video signal would include lines 4, 7, 10, 13, etc. This sequence is properly interlaced. Read address generator 110 may, for example, be a counter with preset capability. Normally, the counter presets to a first predetermined address, corresponding to the location of the beginning of the first auxiliary video signal line. It presets to a second predetermined address, corresponding to the location of the beginning of the second line, when interlace inversion has been detected.

Figure 2:
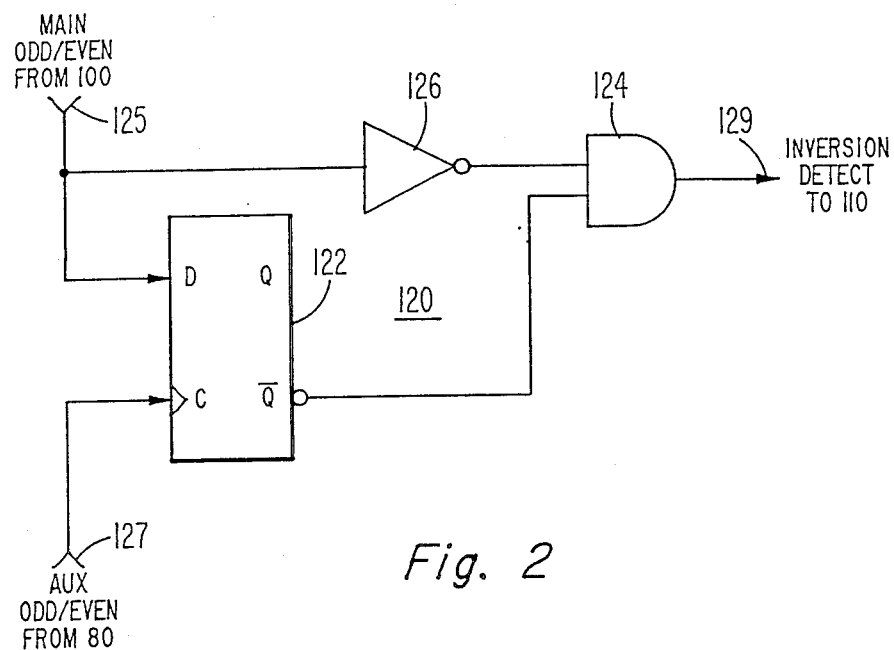
FIG. 2 is a logic diagram of an interlace inversion detector which may be used in the picture-in-picture video signal processor illustrated in FIG. 1.

FIG. 2 illustrates a possible embodiment of an interlace inversion detector 120 which may be used in the picture-in-picture signal processor illustrated in FIG. 1. In FIG. 2, an input terminal 125 is coupled to the third output terminal of the main synchronization component separator 100 (of FIG. 1), and receives a signal indicating whether the current main video field is an even or an odd field. Input terminal 125 is coupled to a D input terminal of a D-flip flop 122 and an input terminal of an inverter 126. An output terminal of inverter 126 is coupled to a first input terminal of an AND gate 124. A $\overline{Q}$ output terminal of D-flip flop 122 is coupled to a second input terminal of AND gate 124. An output terminal of AND gate 124 is coupled to an output terminal 129 of the interlace inversion detector 120. Output terminal 129 is coupled to the second input terminal of read address generator 110 (of FIG. 1). An input terminal 127 is coupled to the third output terminal of the auxiliary synchronization component separator 80 (of FIG. 1), and receives a signal indicating whether the current auxiliary field is an even or an odd field. Input terminal 127 is coupled to the clock input terminal (indicated by the small triangle) of the D-flip flop 122.

Figure 3:
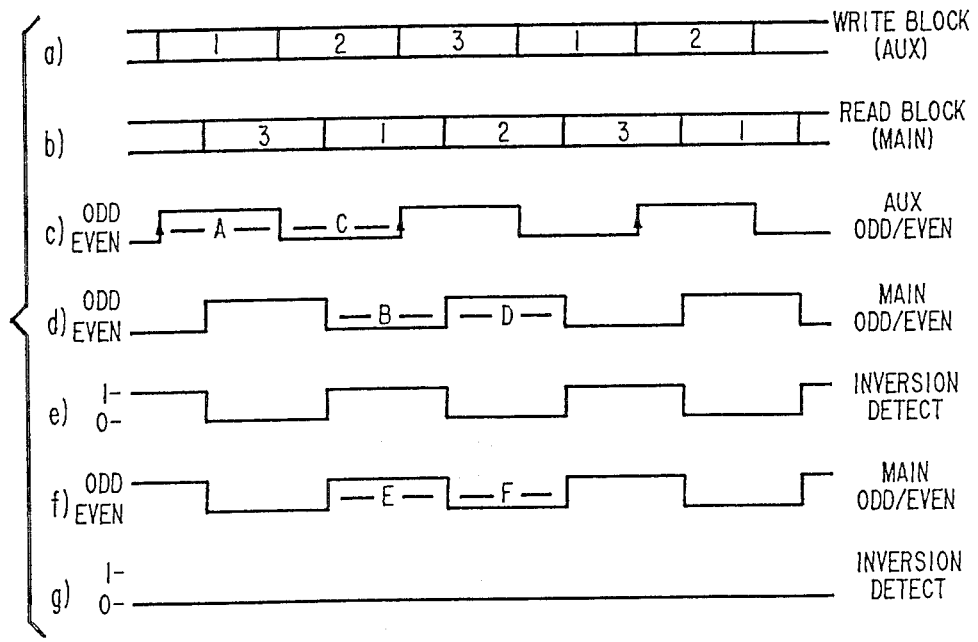
FIG. 3 is a timing diagram useful in understanding the operation of the interlace inversion detector illustrated in FIG. 2.

The operation of the interlace inversion detector illustrated in FIG. 2 may be better understood by referring to the waveform diagrams illustrated in FIG. 3. As described above, memory 70 (of FIG. 1) has the capacity to hold three fields of compressed auxiliary video signal information. Memory 70 is divided into three blocks designated 1, 2, and 3. Each block of memory can hold a field of compressed auxiliary video signal information. Successive fields of auxiliary video samples are written into successive blocks of the memory 30 in round-robin fashion. In FIG. 3, waveform (a) indicates the block number into which data representing the current auxiliary video field is being written. The field scanned in the first field time period is written into block 1; the next field is written into block 2; the next into block 3; and so forth. Waveform (b) represents the block from which data is read and inserted into the main video signal to form the picture-in-picture video signal. The first field is read from block 3; the next field from block 1; the next from block 2; and so forth.

Waveform (c) indicates the odd/even status of the auxiliary video signal. The leftmost field is an odd field;

the next field is an even field; and so forth. Thus, the field written into block 1 (during the leftmost field time) is an odd field. Waveform (d) is the odd/even status of the main video signal. The leftmost field of the main video signal is an odd field; the next field is even; and so forth.

During field time period A in waveform (c), an odd field of the auxiliary video signal is written into block 1. During field time period B in waveform (d), block 1 is inserted into the main video signal. However, the main video signal is scanning an even field. During field time period C of waveform (c), an even auxiliary video field, is written into block 2. During field time period D of waveform (d), block 2 is inserted into an odd main video field. Under these circumstances, the auxiliary image interlace is inverted and some correction must be made. The correction, as described above, may be: beginning the retrieval of samples from memory 70 (of FIG. 1) from the second stored line during even main video fields.

Referring again to FIG. 2, the state of the signal at the D input terminal of D flip-flop 122 is latched at the Q output terminal, and its inverse at the $\overline{Q}$ output terminal at the leading edge of the signal at the clock input terminal. Referring to FIG. 3, waveform (c) is presented to the clock input terminal, and waveform (d) to the D input terminal. Waveform (d) is a logic '0' signal at every leading edge (indicated by small arrows) of waveform (c). The $\overline{Q}$ output terminal is, thus, a logic '1' signal. This logic '1' signal at the input terminal of AND gate 124 enables it to pass the signal at its other input terminal. This signal is an inverted version of the main odd/even status signal and is waveform (e). When the output of AND gate 124 is a logic '1' signal, then the read address generator 110 (of FIG. 1) is conditioned to present its modified address sequence to memory 70 (of FIG. 1), and presents its normal address sequence otherwise.

Referring again to FIG. 3, waveform (f) illustrates the opposite main video signal odd/even phasing to that of waveform (d). In this case, during field time period E, odd field auxiliary video samples previously written into block 1, are inserted into an odd main video field. During field time period F, even field auxiliary video samples, previously written into block 2, are inserted into an even main video field. Under these circumstances, no correction is needed.

In this case, waveform (c) is presented to the clock input terminal of D flip-flop 122 and waveform (f) is presented to the D input terminal. Waveform (f) is a logic '1' signal at every leading edge of waveform (c). The $\overline{Q}$ output terminal is, thus, a logic '0' signal. AND gate 124 is disabled and produces a logic '0' signal, which is waveform (g), at its output terminal. Read address generator 110 (of FIG. 1) is thus, conditioned to generate only its normaly address sequence.

What is claimed is:

1. In a picture-in-picture video signal generator comprising:
    a source of an auxiliary video signal;
    an auxiliary synchronization component separator, coupled to said auxiliary video signal source, for producing an auxiliary odd/even signal indicating whether a current field of said auxiliary video is an odd field or an even field;
    a memory, coupled to said auxiliary video signal source, for storing data representing said auxiliary video signal and subsequently retrieving said data;
    a source of main video signal;
    a main synchronization component separator, coupled to said main video signal source, for producing a main odd/even source indicating whether a current field of said main video signal is an odd field or an even field;
    means, coupled to said main video signal source and said memory, for inserting a signal representing said retrieved data from said memory into a portion of said main video signal to form said picture in picture video signal;
    interlace inversion detector means, coupled to said main and auxiliary synchronization component separators, for generating a detector output signal having a first state when either: odd field auxiliary video signal information is retrieved from said memory during an even field of said main video signal, or even field auxiliary video signal information is retrieved from said memory during an odd field of said main video signal, and having a second state otherwise; and
    means for correcting said interlace invesion responsive to said detector output signal.

2. In a picture-in-picture video signal generator comprising:
    a source of an auxiliary video signal;
    an auxiliary synchronization component separator, coupled to said auxiliary video signal source, for producing an auxiliary odd/even signal indicating whether a current field of said auxiliary video signal is an odd field, or an even field
    a memory, coupled to said auxiliary video signal source, for storing data representing said auxiliary video signal and subsequently retrieving said data;
    a source of a main video signal;
    a main synchronization component separator, coupled to said main video signal source, for producing a main odd/even signal indicating whether a current field of said main video signal is an odd field or an even field;
    means, coupled to said main video signal source and said memroy, for inserting a signal representing said retrieved data from said memroy into a portion of said main video signal to form said picture-in-picture video signal;
    interlace inversion detector means, coupled to said main and auxiliary synchronization component separators, and including a D flip-flop having a clock input terminal responsive to said auxiliary odd/even signal, a D input temrinal responsive to said main odd/even signal, and a $\overline{Q}$ output terminal for producing a detector output signal, having a first state when either: odd field auxiliary video signal information is retrieved from said memory during an even field of said main video signal, or even field auxiliary video signal information is retrieved from said memory during an odd field of said main video signal, and having a second state otherwise; and
    means for correcting said interlace inversion responsive to said detector output signal.

3. The signal generator for claim 2, wherein said interlace inversion corrector corrects alternate fields of said picture-in-picture video signal, and comprises: an AND gate having a first input terminal responsive to said main odd/even signal, a second input terminal coupled to said $\overline{Q}$ output terminal of said D flip-flop, and an output terminal for producing said detector output signal.

4. The signal generator of claim 3, wherein said interlace inversion corrector further includes an inverter responsive to said main odd/even signal, and having an output terminal coupled to said second input terminal of said AND gate.

* * * * *